United States Patent [19]
Schaefer

[11] 3,756,481
[45] Sept. 4, 1973

[54] CARRYING CASE

[75] Inventor: Roger W. Schaefer, Arcadia, Calif.

[73] Assignee: Safariland Leather Products,
Monrovia, Calif.

[22] Filed: Mar. 1, 1972

[21] Appl. No.: 230,653

[52] U.S. Cl.. 224/42.42 A, 224/42.46 B, 224/45 Q, 224/45 W
[51] Int. Cl. .............................................. B60r 7/00
[58] Field of Search .................... 224/29 D, 42.42 A, 224/42.45 B, 42.46 B, 42.01, 46 R, 45 C, 45 W; 206/19.5 R, 19.5 B; 220/95

[56] References Cited
UNITED STATES PATENTS

| | | | |
|---|---|---|---|
| 2,635,797 | 4/1953 | Siebert | 220/95 X |
| 2,645,392 | 7/1953 | Gottsegen et al. | 224/42.45 B |
| 2,778,554 | 1/1957 | Porkola | 206/19.5 R |

*Primary Examiner*—Robert G. Sheridan
*Assistant Examiner*—Jerold M. Forsberg
*Attorney*—Robert L. Parker, Richard D. Seibel et al.

[57] ABSTRACT

A carrying case particularly useful for police officers or the like is provided in practice of this invention. The case has a hollow partitioned box-like body open at its top for carrying articles. At the back of the body there is a support frame including arched members that fit over the back of an automobile seat for supporting the body. A transverse bar between the tops of the arched members has a raised keystone-shaped central handle which doubles as a hat or helmet support. At the right side of the case is an upright tube for receiving a flashlight so as to be remote from the driver of a car. The body is made of the self-supporting material that is sufficiently elastically flexible to prevent substantial injury if struck by a person in an automobile collision. The support frame is hinged to the body so as to be upright for use in an automobile or for carrying or to lie adjacent the top of the box for more compact storage.

8 Claims, 3 Drawing Figures

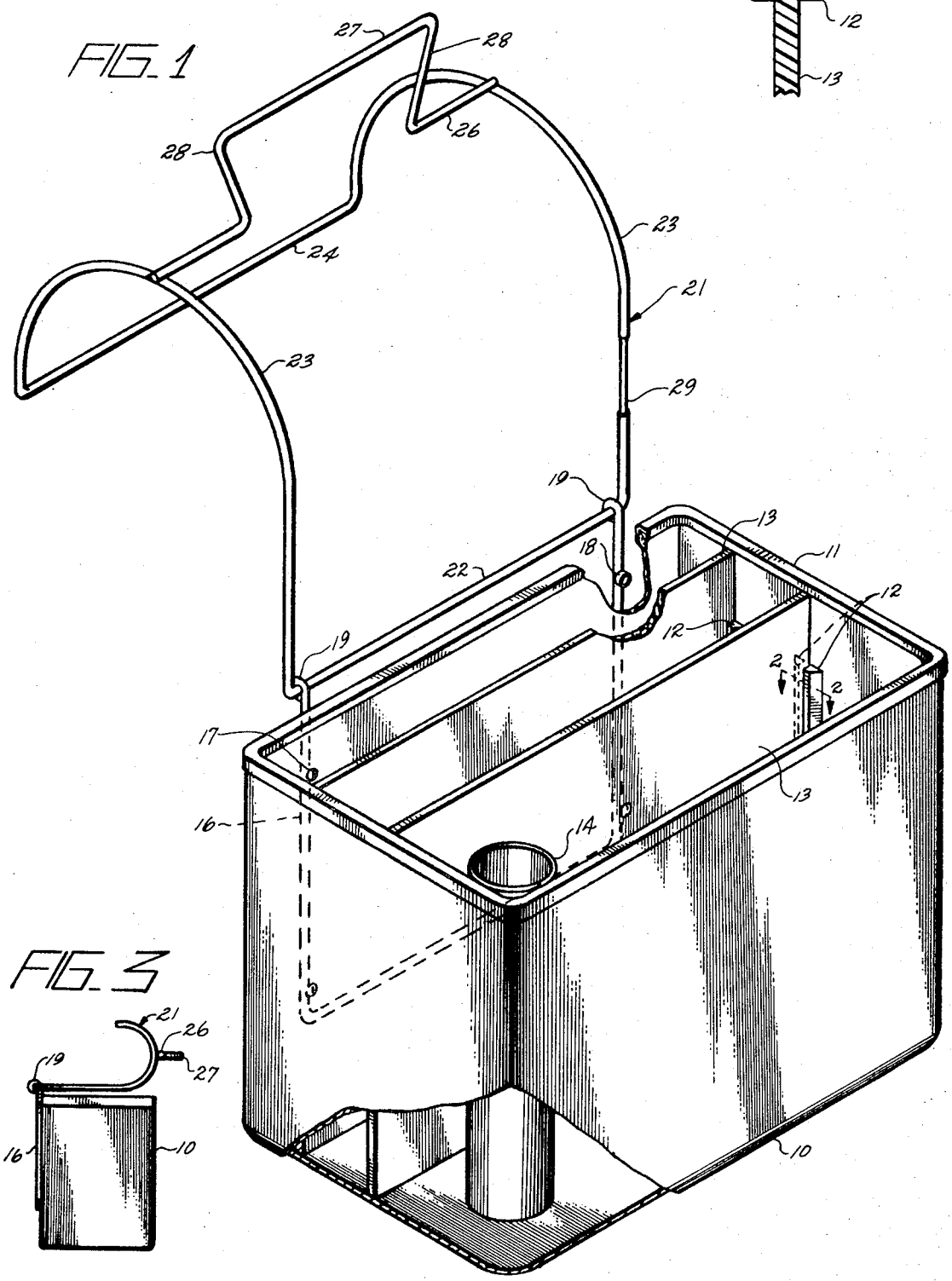

CARRYING CASE

BACKGROUND

Because of the varied duties required of a modern police officer, it is necessary for him to carry a large number of items in his patrol car for carrying out these duties. When he leaves the vehicle for an accident investigation, or other routine investigation he must carry a number of different papers and articles with him to cover a variety of circumstances. Many of these things are either the personal property of the officer or are specifically issued to him as an individual so that he has the responsibility for the property. He, therefore, removes the articles from the automobile at the end of his shift and stores then in a locker at his station.

Since there are so many articles and such a variety of them it becomes highly advantageous to have a convenient storage and carrying container that can be widely used. Otherwise, the articles may be strewn across the front seat of the patrol car or stowed in an inconvenient briefcase or laid on the dashboard or the like. When this is done, it is inconvenient to locate the needed articles quickly, and it becomes quite inconvenient to carry the variety of articles to the scene of an investigation. This is particularly true when it is necessary to quickly leave the automobile with the possibility of apprehending a suspect. Such a carrying case should also be useful for storing the articles in the officer's locker between shifts. In addition to the inconvenience of having loose articles in the automobile, there is a safety hazard in case the automobile is involved in a collision or the like. Clipboards, flashlights and such articles can become dangerous projectiles.

It is, therefore, highly desirable to provide a carrying case for police officers that is convenient for use in the automobile or for manual carrying to an investigation. Such a carrying case should be readily stored and should provide safe storage for a variety of articles in case of a collision or the like.

BRIEF SUMMARY OF THE INVENTION

There is, therefore, provided in practice of this invention according to a presently preferred embodiment a carrying case having a hollow box-like body open at its top for carrying articles. A support frame at the back of the box includes a pair of interconnected arched members for fitting over the back of an automobile seat. The support frame is preferably pivotally connected to the back of the body for tilting between an upright position for fitting over the back of an automobile seat or carrying and a lowered position adjacent the top of the body for storage. Preferably there is a transverse bar extending between the tops of the arched members including a raised central portion serving the dual function of a carrying handle and a hat or helmet rack.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in partially cutaway perspective a carrying case constructed according to principles of this invention;

FIG. 2 illustrates in fragmentary cross section a detail of a partition support in the carrying case; and FIG. 3 illustrates in side view the case of FIG. 1 with its support frame folded down for storage.

DESCRIPTION

FIG. 1 illustrates in partial cutaway a carrying case constructed according to principles of this invention. As illustrated in this presently preferred embodiment, there is a box-like body 10 that is open at its top and with a closed bottom. The corners of the body are rounded, and it is preferably made in one piece out of a plastic material such as ABS resin, vinyl, or the like, which is sufficiently rigid to be self-supporting and have appreciable rigidity so that relatively weighty objects can be carried. The material should, however, be sufficiently elastically flexible so that if struck by a person or thrown against a person in an automobile collision or the like it will give without causing severe injury. A molded rubber lip 11 is cemented around the top of the body to provide cushioning of this region and a relatively broad surface along the edge with the same aim of reducing any probability of injury in case of a collision or the like.

A set of parallel vertical strips 12 are molded directly in the sides of the body. The cross section of a pair of these strips is best seen in the fragmentary detail of FIG. 2. Opposed sets of the strips on opposite sides of the body provide support for removable upstanding partitions 13 which subdivide the interior of the body into compartments. Preferably the partitions are made of a material similar to the body so as to be sufficiently elastically flexible to prevent injury in case of a collision.

At the forward right-hand corner of the body there is a tube 14 cemented to the walls. If desired, the tube may be made in somewhat different form so as to be integral with the walls of the body. As mentioned above, a carrying case as provided in practice of this invention is particularly useful for police officers who carry a variety of articles when on patrol or conducting an investigation. The tube 14 is typically employed for receiving a flashlight which is thus convenient to the officer at all times. By positioning the tube in the right-hand side of the carrying case, it is remote from the officer who is driving the patrol car, thereby minimizing the probability of injury in an accident as compared with any other position of flashlight storage.

In a typical embodiment, the body is about 10 inches deep and 13 inches wide. It is found that a thickness from front to back of about 8 inches is sufficient for storing most of the articles required by a police officer on patrol or during routine investigations. The partitions within the body provide support for some of the articles typically carried. Thus, for example, between the two partitions ordinary file folders containing forms or the like may be stored in an upright position without spilling their contents. It is convenient to store a clipboard in the rear compartment, and typically there is sufficient room for additional file folders in this area as well. The forward compartment may serve to hold the officer's citation book, a short baton, extra ammunition, or other routine or emergency articles.

A rigid U-shaped frame 16 is fastened onto the back of the body by short bolts 17, which may, for example, be screwed into threaded bosses 18 on the frame 16. It has also been found that the expense of an added boss can be eliminated merely by flattening the rod forming the U-shaped frame 16 and providing a threaded hole therethrough for receiving the bolts. A through hole may accomodate a nut and bolt or a rivet. The top of each leg of the U-shaped frame is curled over to form an open eye 19.

A support frame 21 is pivotally connected to the U-shaped frame 16 by a straight bar 22 passing through the two eyes 19. The bar and eyes thus form a hinge-like connection between the support frame and the body 10. At each end of the bar 22 there is an arched member 23 which, as illustrated in FIG. 1, extends upwardly from the back of the box and then arches rearwardly so that when the carrying case is used in an automobile the arched members fit over the back of the automobile seat. The ends of the arched members 23 are interconnected by a transverse bar 24 to provide a closed loop and avoid dangerous exposed ends.

A transverse bar 26 extends between the tops of the arched members and is typically a separate piece welded to the bar forming the arched members. The transverse bar 26 has a central raised portion 27 connected to the rest of the transverse bar by nonparallel legs 28, which are further apart at their upper end than at their lower end. The raised central portion thereby has a keystone shape, wider at its top than at its bottom. The raised portion serves a dual function in providing a handle for lifting the carrying case from its position on the back of an automobile seat and for carrying it during an investigation or the like; in addition, the raised portion with its outward flare provides an ideal spot for an officer to place his hat or helmet while in the car.

Thus, in a typical usage, the various items needed by an officer are all carried in one location right beside him on the patrol car seat. His citation book, flashlight, various forms, and clipboard are individually available as he may wish, and are kept in a fixed and convenient location. His hat or helmet is positioned on the back of the seat immediately beside him so that it can be reached quickly and conveniently. The flare of the raised handle serves to retain the hat or helmet in position during normal car operations. If the officer should leave the vehicle, he may take individual articles from the case, or if he prefers, he merely lifts it by the raised handle and carries it with him.

At the end of an officer's shift, the carrying case may be stored in the officer's locker at the station. Such lockers are typically relatively shallow and the hinged connection between the support frame and the body permits the frame to pivot forwardly relative to the body towards the position like that illustrated in FIG. 3. When the frame is pivoted forward in this manner it readily fits in a station locker. In addition, the hinged connection between the arched support frame and the body permits the carrying case to conform to the minor differences between different automobile seats so that a close fit is readily obtained.

In the interests of safety, it is preferred that the U-shaped frame 16 and support frame 21 be provided with rigidity by a steel bar 29 as seen in the cutaway portion of FIG. 1. The steel bars forming the frames are preferably coated with a thick layer of vinyl or the like to provide substantial cushioning and eliminate any raw edges that may be present on the steel.

Although but one embodiment of carrying case constructed according to principles of this invention has been described and illustrated herein, many modifications and variations will be apparent to one skilled in the art. Thus, for example, the partitions subdividing the body of the case may be permanently installed and the flashlight tube may be connected to one of the partitions. If desired, the support frame may be made without a hinge joint if commodious storage space is available, or if it is planned to leave the carrying case in a vehicle much of the time. Many other modifications and variations will be apparent to one skilled in the art, and it is therefore to be understood that within the scope of the appended claims the invention may be practiced otherwise than as specifically described.

What is claimed is:

1. A carrying case comprising:
   a hollow box-like body open at its top for receiving articles to be carried and having a front and a back;
   a support frame including a pair of interconnected, spaced apart arched members for fitting over the back of an automobile seat for supporting the body;
   a transverse bar extending between the tops of the arched members including a raised central handle portion; and
   hinge means connecting the support frame and the back of the body for tilting the frame between an approximately upright position for fitting over the back of an automobile seat or carrying and a lowered position adjacent the top of the body for storage.

2. A carrying case as defined in claim 1 wherein the body includes an upstanding tube adjacent its right side for receiving a flashlight or the like.

3. A carrying case as defined in claim 1 further comprising a U-shaped frame connected to the back of the body and having a pair of eyes at the upper end of the legs and wherein the support frame includes a transverse bar cooperating with the eyes to form the hinge means between the support frame and the body.

4. A carrying case as defined in claim 3 wherein the raised central portion includes legs spaced relatively further apart at their upper ends and relatively closer together at their lower ends for forming a keystone-shaped combined handle and hat support.

5. A carrying case as defined in claim 4 sufficiently cushioned, rounded and formed of material sufficiently elastically flexible to prevent substantial injury if struck by a person in an automobile collision or the like.

6. A carrying case comprising:
   a hollow box-like body open at its top for receiving articles to be carried and having a front and a back;
   an upstanding partition dividing the interior of the body into a front compartment and a back compartment;
   an open topped, upstanding sleeve in one compartment at the right side of the body, said body, partition and sleeve being formed of self supporting material that is sufficiently elastically flexible to prevent substantial injury if struck by a person in an automobile collision or the like;
   a support frame connected on the back of the body, said frame including a pair of interconnected, spaced apart arched members for fitting over the back of an automobile seat for supporting the body;

a transverse bar extending between the tops of the arched members including a raised keystone-shaped central region.

7. A carrying case as defined in claim 6 wherein the support frame comprises a transverse bar between the rearward ends of the arched members and a transvere bar between the forward ends of the arched members for forming a closed loop and further comprising:

a U-shaped frame connected to the back of the body with the ends of the legs of the U formed into eyes adjacent the top of the box; and wherein the forward transverse bar extends through the eyes for pivotally connecting the support frame to the U-shaped frame.

8. A carrying case as defined in claim 7 further comprising sets of parallel strips on opposite sides of the interior of the body for receiving and temporarily holding the upstanding partition.

* * * * *